United States Patent Office 2,800,462
Patented July 23, 1957

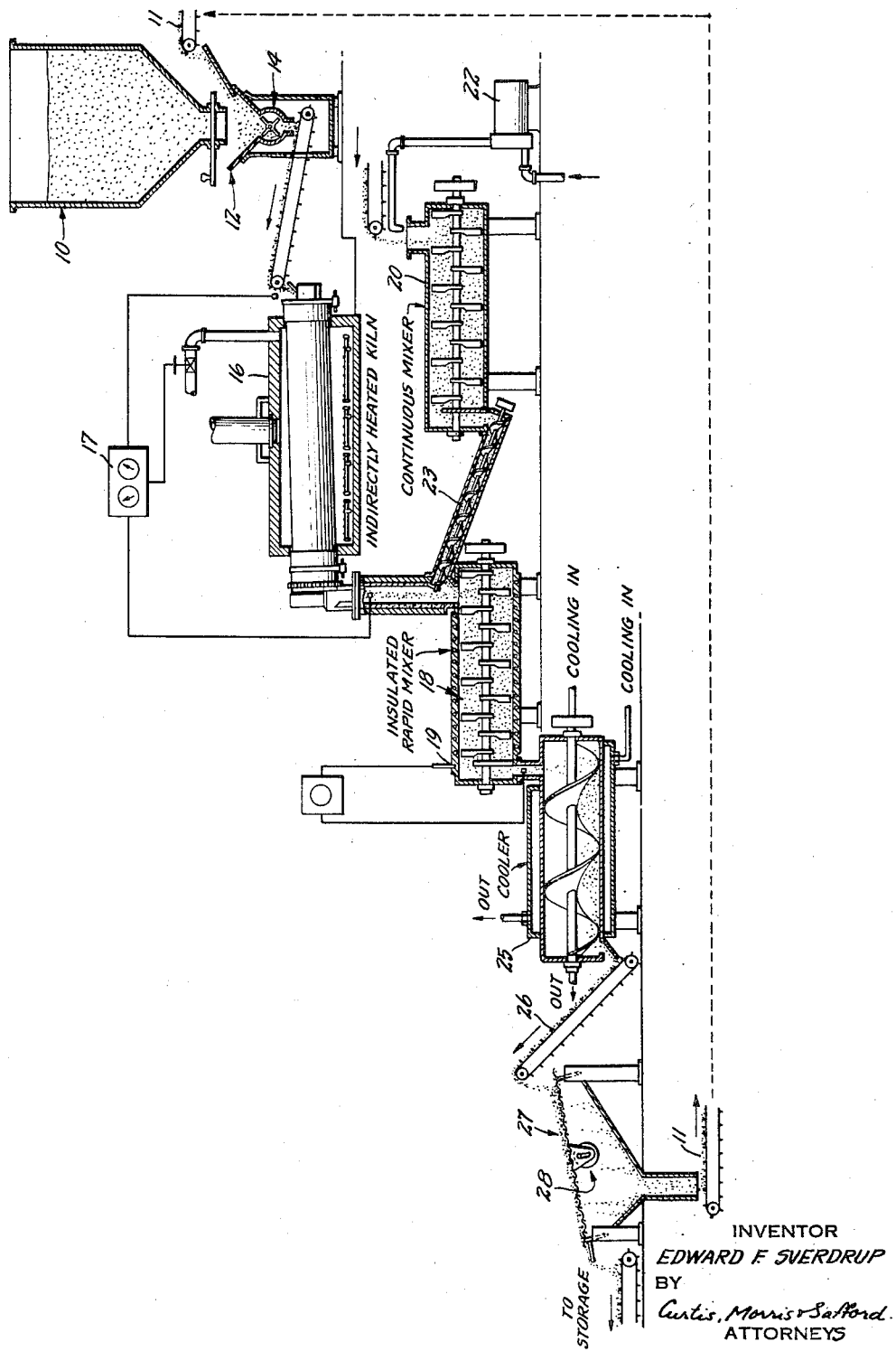

2,800,462

METHOD OF PRODUCTION OF RECLAIMED RUBBER IN DISCRETE PARTICLE FORM

Edward F. Sverdrup, Buffalo, N. Y., assignor to U. S. Rubber Reclaiming Co. Inc., Buffalo, N. Y.

Application February 12, 1953, Serial No. 336,514

10 Claims. (Cl. 260—2.3)

This invention relates to the reclaiming of rubber and like materials, and more particularly to the production of reclaimed rubber in discrete-particle form.

In the various methods of reclaiming rubber as heretofore practiced, the reclaim is produced in dense or agglomerate form. Even in the processes wherein the scrap rubber is broken up into crumb and treated at high temperature in crumb form, it is treated as an agglomerate mass in which heat has to be transferred through one or many parts of the mass in order to reach the interior portions or particles. As a consequence, some particles are over-heated while others do not receive enough heat for satisfactory plastication, and, even if the rubber remains in crumb form throughout the heat treatment, reclaiming cannot be considered complete until it has been put through a refining treatment to get rid of the still unplasticated particles of un-treated or under-treated rubber. The product is accordingly in the form of dense or crepe-like masses.

For many purposes it is most advantageous to supply reclaimed rubber in small pieces which may be referred to as being in "discrete particle," "granular," "pelletized" or "crumb" form. For greater clarity, we shall reserve the term "pelletized reclaim" for reclaimed rubber which is broken up or reformed into small pieces after having been compacted in massive form. We shall describe all such products generally as "discrete particle" form; without implying that the particles are crumb which has remained as such during reclaiming.

I have found, moreover, that rubber can be reclaimed with many advantages by keeping it in "crumb" form while subjecting it to reclaiming temperature, with or without mechanical working, in a fluent heat-exchange and parting medium, such as a powder which will coat the surfaces of the rubber particles and lubricate them against adhesion to other rubber particles. Such a medium serves both to lubricate the rubber particles, preventing their re-adherence when the rubber scrap becomes plastic during the devulcanizing operation, and to transfer heat to and from heat control surfaces such as the walls of jacketed chambers, or heated impellers.

In rubber-reclaiming operations according to this process, surprising improvements in effectiveness may be obtained by preheating the powder so that it carries all or substantially all the heat necessary to bring the rubber with which it is mixed up to devulcanizing temperature. The difficultly-controlled devulcanizing operation is initiated much faster and much more uniformly by intermingling the comminuted rubber intimately with such a heated powder, which comes into immediate contact with substantially all the particles of pre-comminuted rubber and immediately initiates the devulcanizing operation uniformly throughout the mass.

Bearing in mind that the devulcanizing operation involves the breaking down of large molecules into smaller ones by scission induced by thermal, mechanical, and/or chemical means (just as vulcanization is the result of uniting pluralities of molecules into larger ones by cross-linking through sulfur) it will be understood that, when heat reaches most of the particles of a mix quickly and at about the same time, much more uniform and effective thermal devulcanizing action will be brought about than under ordinary conditions where heat must penetrate slowly into the mix, tending to overheat exterior portions before adequately heating the interior.

A wide range of fluent media having good heat-transfer and parting properties may be employed. Powders 99% of which pass a 325-mesh screen give effective results. Examples of powders adapted for effective use in accordance with the invention are whiting, activated carbon, talc, barytes, mineralite mica, graphite, lithopone, aluminum silicate, cryolite, calcium silicate, and other suitable materials which will stand the temperatures used. While the minimum useful proportion depends upon the character of the powder and the rubber, it may be said in general that a proportion of powder less than 10% of the 20-mesh crumb will not effectively surround and heat the rubber particles, and quantities above 3000% of the crumb are inefficient. The minimum quantity of any particular dusting powder which gives effective results depends to a large extent on the heat capacity of the powder and upon temperature conditions desired. Such minimum amount can be computed from the following data:

Desired devulcanization temperature $=r$
Dusting powder temperature $=p$
Initial crumb temperature $=c$
Specific heat of rubber $=h$
Specific heat of dusting powder $=H$
Amount of dusting material $=X$
Amount of rubber $=1$ (unity)

According to the following equation:

$$HX(p-r) = 1h(r-c)$$

A wide variety of types of rubber may be treated in accordance with the invention. Among them may be mentioned natural rubber, GR–S (Buna–S), neoprene, butyl rubber, and copolymers of butadiene and acrylonitrile (Buna–N).

Treating times may run from a minute and a half to an hour or more, but effective results can ordinarily be obtained in three minutes or less by a procedure such as exemplified in the drawing.

In carrying out the procedure in the exemplified manner, a suitable powder such as whiting is conducted from a storage bin 10 and/or return conveyor 11 to a surge hopper 12 and thence through a feeding means 14 which feeds powder at a constant rate to a rotary kiln 16 which is indirectly heated under control of a thermostat 17. From the kiln it is delivered at a temperature of from 450° F. to 750° F. to an insulated rapid mixer 18, in which temperature may be maintained by heating elements 19.

Crumb rubber which will pass a 30-mesh and be retained on a 40-mesh screen is carried through a continuous mixer 20 to which reclaiming oils and/or suitable chemical or other reclaiming agents are introduced by a proportioning pump 22. The material from the crumb mixer 20 is fed by a conveyor 23 into the insulated mixer 18 together with hot powder from kiln 16. This powder, as it is intensively mixed with the crumb rubber by the mixer 18 acts as heat transfer medium and as a dusting powder to keep the rubber particles separate and in free motion. Thus the individual particles of the crumb rubber are heated rapidly and uniformly to effective devulcanizing temperature.

The mass of powder may also serve to control oxidation of each particle by effectively surrounding it with inert powder particles so as to prevent undesirable access of oxygen thereto. In the chamber 18, the loose mixture of hot whiting and crumb rubber throughout rapidly reaches a uniform temperature in the desired range, e. g., from 300° to F. to 450° F.

Due to the very rapid heating of the rubber made possible by this method the devulcanization reaction begins at once, and proceeds uniformly throughout all of the rubber. The treatment may continue for a long time as in the old pan process, in which case heating may be continued by heat applied through the mixer wall which, by virtue of the constant agitation of the mass of powder, will be uniformly distributed through the rubber; or the treatment may be for a very short period, according to the Elgin and Sverdrup Patent No. 2,415,449, dated February 11, 1947, in which case the heat initially supplied in the powder and conserved by efficient insulation on the mixer 18 will ordinarily suffice without application of additional heat at 18.

As the mixture of powder and rubber crumb leaves the mixer 18, it falls into a cooler 25 which rapidly cools the mass to a temperature of from 70° F. to 150° F. From the cooler, the mass is fed by conveyor 26 onto a vibrating screen 27 which may be an 80-mesh screen vibrated by a vibrating means 28 and through which the excess whiting falls onto a conveyor 11, whence it is conducted back to surge hopper 12.

There may be produced devulcanized crumb of a size such that 98% thereof will pass a 20-mesh screen.

While there are given below certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

Example 1

650 parts of whiting all of which would pass a 100 mesh screen and 98% of which would pass a 200 mesh screen is heated to 588° F. in an indirectly heated rotary kiln. The hot whiting is then rapidly mixed with 150 parts by weight of a rubber-oil mix containing 100 parts of 30–40 mesh vulcanized rubber crumb (made from tire scrap containing about equal parts of natural rubber and GR–S) mixed with 0.3 part xylyl disulfides, 12 parts of a petroleum oil, such for example, as one having a viscosity at 100° F. of 150–160 seconds, an A. S. T. M. flash point of 325–330° F., a fire point of 370–380° F., a pour point test of —30° F. max., a color NPA of 2, a Conrad carbon of .02%, a specific gravity of 0.9309, and an A. P. I. gravity of 20.5; 4 parts of a resinous physical agent, such for example as one having a specific gravity of about 1.06, a softening point (ring and ball 135) of about 145° F., and a acid number of 146; and 3 parts of a mixture of terpene hydrocarbons having a specific gravity of 0.872 at 15.2° C., an index of refraction at 20° C. of 1.482, Engler distillation data giving:

| | |
|---|---|
| 1st drop | 178° C. |
| 5% | 182° C. |
| 20% | 185° C. |
| 40% | 186.5° C. |
| 60% | 187° C. |
| 80% | 188° C. |
| 90% | 190° C. |
| 95% | 191.5° C. |
| Dry | 200.0° C. | and a flash point, open cup of 136° F., and which imparts to it an initial temperature of 400° F.

This mixture is held for 3 minutes in a thermally insulated mixer and then discharged into a cooler prior to being passed over a 60 mesh sieve to remove the excess whiting. The rubber portion when passed through a tight laboratory mill forms a sheet with a degree of plasticity and softness which shows effective devulcanization.

Example 2

110 parts by weight of whiting, all of which would pass a 100-mesh screen and 98% of which would pass a 200-mesh screen, is heated to 750° F. while being passed through a rotary kiln as exemplified at 16. The heated whiting is then mixed in an insulated chamber, as at 18, with a rubber-oil mix containing 100 parts by weight of 20-mesh vulcanized crumb, 0.3 part of xylyl disulfides, 12 parts of processing oil, and 4 parts of petroleum resin. It is retained therein for 20 minutes, to produce a devulcanized crumb which has remained in discrete particle form most of the particles whereof will pass a 20-mesh screen.

Example 3

1100 parts of the same whiting as that of Example 2 is heated to 550° F., as at 16, and mixed as at 18 for about three minutes with the rubber-oil mix of Example 2. A devulcanized crumb, most of which will pass a 20-mesh screen, is produced.

Example 4

A procedure similar to that of Example 3 except that 180 parts of whiting are employed, with the mix remaining in chamber 18 for 20 minutes; yielding a devulcanized crumb as above.

Example 5

161.5 parts of whiting as in Example 1 is heated to 450° F., and mixed with 100 parts of a rubber-oil mix as set forth in Example 1 except that 20-mesh crumb is used, for 5 minutes; yielding a devulcanized crumb as above.

Example 6

3,000 parts of whiting is heated to 427° F. and mixed with 100 parts of a rubber-oil mix, as set forth in Example 5, for 5 minutes; yielding a devulcanized crumb as above.

Example 7

240 parts of barytes similarly powdered is heated to 750° F. and mixed with 100 parts of a rubber-oil mix, as set forth in Example 5, for 4 minutes; yielding a devulcanized crumb as above.

Example 8

400 parts of graphite similarly powdered is heated to 480° F. and mixed with 100 parts of a rubber-oil mix, as set forth in Example 5, for 5 minutes; yielding a devulcanized crumb as above.

Example 9

360 parts of carbon black of a similar or lesser fineness is heated to 500° F. with 100 parts of a rubber-oil mix, as set forth in Example 5, for 10 minutes; yielding a devulcanized crumb as above.

I claim:

1. The method of reclaiming vulcanized rubber scrap which comprises preheating a particle separating powder to a temperature of between about 450° F. and 750° F., immediately mixing the powder with comminuted vulcanized rubber scrap and subjecting a loose mass of the mixture in the absence of compacting pressure to a mechanical agitation for a sufficient time that the heat of the powder softens the surfaces of the rubber particles sufficiently to cause the powder to adhere thereto and form a protective coating about the rubber particles which tends to inhibit oxidation of the rubber particles and to inhibit cohesion thereof and reclaims the rubber particles, and discharging the powder-coated reclaimed rubber particles as discrete particles, the powder being present in a volume of at least 23% of the volume of the scrap.

2. A method as set forth in claim 1 wherein the materials are continuously mixed and the mixture then passed through a temperature-maintaining zone.

3. A method as set forth in claim 2 wherein said zone is enclosed.

4. A method as set forth in claim 1 wherein excess powder is removed from the comminuted particles after the treatment.

5. A method as set forth in claim 1 wherein 100 percent of the powder will pass a 100-mesh screen and only 2 percent will remain on a 200-mesh screen.

6. A method as set forth in claim 1 wherein the powder is whiting.

7. A method as set forth in claim 1 wherein the powder is carbon black.

8. A method as set forth in claim 1 wherein the powder is talc.

9. A method as set forth in claim 1 wherein the powder is barytes.

10. A method as set forth in claim 1 wherein the powder is graphite.

References Cited in the file of this patent

UNITED STATES PATENTS

| | | |
|---|---|---|
| 693,151 | Price | Feb. 11, 1902 |
| 1,024,937 | Heller | Apr. 30, 1912 |
| 1,133,952 | Gare | Mar. 30, 1915 |
| 1,963,943 | Gross | June 19, 1934 |
| 2,278,826 | Castello | Apr. 7, 1942 |
| 2,408,296 | Cotton et al. | Sept. 24, 1946 |
| 2,415,449 | Sverdrup | Feb. 11, 1947 |
| 2,461,193 | Banbury et al. | Feb. 8, 1949 |
| 2,600,430 | Riblett | June 17, 1952 |
| 2,640,035 | Brown et al. | May 26, 1953 |
| 2,767,149 | Wendrow | Oct. 16, 1956 |

FOREIGN PATENTS

| | | |
|---|---|---|
| 580,051 | Great Britain | Aug. 26, 1946 |